United States Patent
Shafi et al.

(10) Patent No.: US 11,124,597 B2
(45) Date of Patent: Sep. 21, 2021

(54) PROCESS FOR MAKING URETHANE ACRYLATES

(71) Applicant: Dow Global Technologies LLC, Midland, MI (US)

(72) Inventors: Muhammad A. Shafi, Lake Jackson, TX (US); Huifeng Qian, Pearland, TX (US); Luigi Pellacani, Carpi (IT); Dwight D. Latham, Clute, TX (US); William L. Heaner, IV, Lake Jackson, TX (US); Qiuyun Xu, Pearland, TX (US); Harshad M. Shah, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 354 days.

(21) Appl. No.: 16/082,210

(22) PCT Filed: Feb. 23, 2017

(86) PCT No.: PCT/US2017/019150
§ 371 (c)(1),
(2) Date: Sep. 4, 2018

(87) PCT Pub. No.: WO2017/151387
PCT Pub. Date: Sep. 8, 2017

(65) Prior Publication Data
US 2020/0291169 A1    Sep. 17, 2020

(30) Foreign Application Priority Data

Mar. 4, 2016  (IT) .................. 102016000022826

(51) Int. Cl.
| | |
|---|---|
| C08G 18/67 | (2006.01) |
| C08G 18/12 | (2006.01) |
| C08G 18/16 | (2006.01) |
| C08G 18/24 | (2006.01) |
| C08G 18/48 | (2006.01) |
| C09D 175/16 | (2006.01) |
| C08G 18/76 | (2006.01) |
| C09J 175/16 | (2006.01) |
| B29C 55/00 | (2006.01) |
| B29K 75/00 | (2006.01) |

(52) U.S. Cl.
CPC ........... *C08G 18/672* (2013.01); *C08G 18/12* (2013.01); *C08G 18/16* (2013.01); *C08G 18/246* (2013.01); *C08G 18/4808* (2013.01); *C08G 18/4812* (2013.01); *C08G 18/4825* (2013.01); *C08G 18/4829* (2013.01); *C08G 18/7621* (2013.01); *C09D 175/16* (2013.01); *C09J 175/16* (2013.01); *B29C 55/005* (2013.01); *B29K 2075/00* (2013.01)

(58) Field of Classification Search
CPC ...... C08G 18/672; C08G 18/12; C08G 18/16; C08G 18/246; C08G 18/4808; C08G 18/7621; C08G 18/4825; C08G 18/4829; C08G 18/4812; B29C 55/005; B29K 2075/00; C09J 175/16; C09D 175/16
See application file for complete search history.

(56) References Cited

U.S. PATENT DOCUMENTS

| | | | |
|---|---|---|---|
| 4,246,391 A | 1/1981 | Watson, Jr. | |
| 4,330,657 A | 5/1982 | Disteldorf et al. | |
| 4,424,333 A | 1/1984 | O'Connor et al. | |
| 4,480,079 A | 10/1984 | Orton et al. | |
| 4,507,458 A | 3/1985 | Shiraki et al. | |
| 4,605,723 A | 8/1986 | Flakus | |
| 4,870,152 A | 9/1989 | Meixner et al. | |
| 5,248,752 A | 9/1993 | Argyropoulos et al. | |
| 5,578,693 A | 11/1996 | Hagstrom et al. | |
| 6,646,057 B1 * | 11/2003 | Anders ................ | C08F 8/30 525/10 |
| 2001/0031838 A1 | 10/2001 | Scott et al. | |
| 2003/0196753 A1 | 10/2003 | Schoenfeld et al. | |
| 2005/0027090 A1 | 2/2005 | Zhu et al. | |
| 2006/0247403 A1 | 11/2006 | Nguyen-Kim et al. | |
| 2008/0125546 A1 | 5/2008 | Yamaguchi et al. | |
| 2008/0277013 A1 * | 11/2008 | Anders ............ | F16L 55/1656 138/98 |
| 2010/0130675 A1 | 5/2010 | Panther | |
| 2011/0172359 A1 | 7/2011 | Panther | |

FOREIGN PATENT DOCUMENTS

| | | |
|---|---|---|
| CN | 103380157 B | 4/2015 |
| EP | 2028202 B1 | 2/2009 |
| WO | 2015098308 A1 | 7/2015 |

OTHER PUBLICATIONS

PCT/US2017/019150, International Search Report and Written Opinion dated May 8, 2017.
PCT/US2017/019150, International Preliminary Report on Patentability dated Sep. 4, 2018.

* cited by examiner

*Primary Examiner* — Rabon A Sergent

(57) ABSTRACT

A process for making a curable resin composition comprising the steps of: (1) reacting a) an isocyanate; and b) a polyol mixture with a bimodal distribution of i) a first polyol mixture comprising polyols having an average equivalent weight of from 50 to 400; and ii) a second polyol mixture comprising polyols having an average equivalent weight of from 1000 to 5000 to form a urethane prepolymer; and (2) adding a capping agent to the urethane prepolymer to form the curable resin composition.

19 Claims, No Drawings

PROCESS FOR MAKING URETHANE ACRYLATES

FIELD OF INVENTION

The instant invention relates to a process for making urethane acrylates.

BACKGROUND OF THE INVENTION

The thermosetting resins used in composites mainly include unsaturated polyesters, vinyl esters, epoxies, phenolics and polyurethanes. Recently, urethane acrylates have been used in composites as well. Many composite applications require high glass transition temperature (usually >75° C.) and high tensile modulus (>2 GPa). Urethane acrylates are generally manufactured by reacting polyisocyantes with polyols in the presence of a suitable solvent to reduce viscosity. In the $2^{nd}$ step, capping compounds (compounds containing an isocyanate-active group and acrylic, methacrylic, vinyl or allyl groups) are reacted. For composite applications, the urethane acrylate must be separated from the solvent and then mixed with reactive diluents (compounds containing acrylic, methacrylic, vinyl or allyl groups). While these compounds can be used as solvents when making urethane acrylates for composites, temperatures must be controlled to minimize the potential for chain polymerization of double bonds. Many of these diluents have low flash points which require extra safety and equipment-related restrictions on the process.

The use of solvent during the synthesis requires the solvent to be eventually removed for use in applications such as composites and adhesives. The use of reactive diluents places extra restrictions on process equipment and conditions. In the presence of volatile reactive diluents, the reaction must be conducted at a low enough temperature for safety reasons and to avoid any free radical polymerization. Therefore, a method which does not require the use of reactive diluents in the high temperature process steps is desired.

SUMMARY OF THE INVENTION

In one broad embodiment of the present invention, there is disclosed a process for making a curable resin composition comprising, consisting of, or consisting essentially of the steps of: (1) reacting a) an isocyanate; and b) a polyol mixture with a bimodal distribution of i) a first polyol mixture comprising polyols having an average equivalent weight of from 50 to 400; and ii) a second polyol mixture comprising polyols having an average equivalent weight of from 1000 to 5000 to form a urethane prepolymer; and (2) adding a capping agent to the urethane prepolymer to form the curable resin composition.

DETAILED DESCRIPTION OF THE INVENTION

The instant invention is a process for making a curable resin composition comprising the steps of: (1) reacting a) an isocyanate; and b) a polyol mixture with a bimodal distribution of i) a first polyol mixture comprising polyols having an average equivalent weight of from 50 to 400; and ii) a second polyol mixture comprising polyols having an average equivalent weight of from 1000 to 5000 to form a urethane prepolymer; and (2) adding a capping agent to the urethane prepolymer to form the curable resin composition.

The polyisocyanates used are typically aromatic, aliphatic, and cycloaliphatic polyisocyanates with a number average molar mass below 800 g/mol. Examples of suitable compounds include, but are not limited to diisocyanates from the group of toluene 2,4-/2,6-diisocyanate (TDI), methylenediphenyl diisocyanate (MDI), triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanatellPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane, and also mixtures thereof.

The polyols used can include polyether polyols and polyester polyols. In various embodiments, the polyols have a functionality of 2.0 or greater. This also includes combinations of polyols that include at least two polyalkylene glycols having different equivalent weights, wherein the short-chain equivalent weight is from 50 to 400 and the long chain equivalent weight is generally 1000 to 5000. Examples include Voranol 8000LM, Voranol 4000LM, Polyglycol P2000, Voranol 1010L, Polyglycol P425, TPG, Voranol 230-660 and mixtures thereof.

The first polyol mixture comprises polyols with lower equivalent weights. The average equivalent weight for these polyols is from 50 to 400. Any and all equivalent weights from 50 to 400 are included herein and disclosed herein; for example, the first polyol mixture can comprise polyols with equivalent weights of 50 to 200, 50 to 150 or 50 to 100.

The second polyol mixture comprises polyols with higher equivalent weights. The average equivalent weight of these polyols is from 1000 to 5000. Any and all equivalent weights from 1000 to 5000 are included herein and disclosed herein, for example, the second polyol mixture can comprise polyols with equivalent weights of from 2000 to 5000, 3000 to 5000, or 4000 to 5000.

The polyols are generally present in the mixture in a high to low equivalent weight of 0.1:1 to 3:1. Any and all ranges between 0.1:1 to 3:1 are included herein and disclosed herein, for example, the ratio of high to low equivalent weight polyols can be 0.4:1 to 1.5:1.

The amount of polyols and isocyanates is adjusted in such a way that the NCO reactive group to NCO group ratio is in the range of from 0.25 to 0.9. The ratio can be 0.4 in various embodiments, and 0.5 in various other embodiments.

The polyol/isocyanate reaction can take place in both a solvent-free and a solvent-containing environment.

In various embodiments, catalysts can be used to accelerate the reaction. Any suitable catalyst that can catalyze a polyol/isocyanate reaction can be used. In general, the catalysts are based on tertiary amines or metal complexes. Tertiary amines used as catalysts include, but are not limited to triethylenediamine (TEDA, 1,4-diazabicyclo[2.2.2]octane or DABCO), dimethylcyclohexylamine (DMCHA), and dimethylethanolamine (DMEA). Metallic compounds based on tin, bismuth, zinc can also be used as catalysts. A particular example of such a catalyst is dibutyltin dilaurate (DABCO T12 from Air Products).

In the next step of the process, an excess of a capping compound is added to react with the unreacted isocyanates from the previous step. The capping compound contains 1) a nucleophile with active hydrogen which reacts with the isocyanate groups, thus capping the urethane with ethylenically unsaturated functional groups, and 2) ethylenically unsaturated functionalities derived from (meth)acrylate or vinyl/allyl groups. Examples of capping compounds that can be used include, but are not limited to hydroxyethyl acrylate, hydroxypropyl acrylate, hydroxyethyl methacrylate, hydroxyethyl acrylamide, hydroxypropyl acrylamide, and mixtures thereof.

At this stage, an inhibitor can optionally be added to avoid the free radical polymerization of the (meth)acrylate. Examples of the inhibitor include, but are not limited to (2,2,6,6-Tetramethylpiperidin-1-yl)oxyl (TEMPO), Mono Methyl Ether of Hydroquinone (MEHQ), dihydroxybenzenes, the benzoquinones, hindered phenols, and hindered phenols based on triazine derivatives. Generally the inhibitor is present in the reaction mixture at a total weight in the range of from 50 to 1000 ppm.

Optionally, a reactive diluent can be added simultaneously with the capping agent or afterwards. The reactive diluent is a liquid reaction medium containing at least one ethylenic double bond. The reactive diluent is curable by polymerization in the existence of free radical catalyst. Examples of such reactive diluents are vinyl toluene, divinyl benzene and (meth)acrylates such as methyl methacrylate, tert-butyl methacrylate, iso-butyl methacrylate, hydroxyethyl acrylate, hydroxypropyl acrylate, hydroxyethyl methacrylate, hydroxyethyl acrylamide, hydroxypropyl acrylamide, and mixtures thereof. Other reactive diluents that can be used are glycols and/or polyether polyols with terminal acrylate or methacrylate groups, thus carrying two or more ethylenic double bonds: preferred diluents include 1,4-butanediol diacrylate (BDDA), 1,6-hexanediol diacrylate (HDDA), diethylene glycol diacrylate, 1,3-butylene glycol diacrylate, neopentyl glycol diacrylate, cyclohexane dimethanol diacrylate, dipropylene glycol diacrylate, tripropylene glycol diacrylate, ethoxylated bisphenol A diacrylate, trimethylolpropane triacrylate, pentaerythritol triacrylate, pentaerythritol tetraacrylate, their corresponding methacrylate analogues, and all other related derivatives. Mixtures of any of the reactive diluents above can also be used.

Optionally, a free radical-generating catalyst can be added along with the reactive diluent. Suitable free radical-generating catalysts include peroxide or azo type compounds. Peroxide compounds include, but are not limited to organo peroxides and hydroperoxides such as tert-Butyl peroxyneodecanoate, benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, and the like. Azo compounds include, but are not limited to azobis-isobutyronitrile, 2-tbutylazo-2-cyano-4-methylpentane, and 4-t-butylazo-4-cyano-valeric acid.

The curable resin composition prepared by the process of the present invention. may include other ingredients, such as activators: these are metal carboxylates capable of increasing the effectiveness of the free radical-generating catalyst, consequently improving the degree of polymerization of the curable resin. Examples of activators include metal carboxylates, and cobalt salts such as cobalt naphtenate, and they may be used at a level of about 0.01 to 1% by weight of the curable resin composition. Accelerators represent another ingredient that can effectively increase the speed and completeness of the radical polymerization of the curable resin. The accelerator may be selected from the group of anilines, amines, amides, pyridines, and combinations thereof. Another example of an accelerator, not selected from the group of anilines, amines, amides, and pyridines is acetylacetone. In various embodiments, the accelerator, if included, includes a dimethyl toluidine or a dialkyl aniline. In various other embodiments, the accelerator, if included, includes N,N-dimethyl-p-toluidine, N,N-diethylaniline, N,N-dimethylaniline, and combinations thereof. If present, the accelerator is generally present in an amount of from 0.01 to 0.5 by weight of the curable resin composition. The curable resin composition prepared by the process of the present invention may also include a gel time retarder. Addition of a gel time retarder decreases the gel time of the curable resin composition. If included, the gel time retarder is generally selected from the group of diones, naphthenates, styrenes, and combinations thereof. In various embodiments, if included, the gel time retarder includes 2,4-pentanedione. In various other embodiments, if included, the gel time retarder is included in an amount of from 0.01 to 0.3 by weight of the resin system.

It should be noted that the free radical catalyst system, namely the peroxides or azo compounds plus the other ingredients directly associated with the speed of radical polymerization (activators, accelerators, retarders) are preferably added to the rest of the curable resin, comprising the urethane acrylate and the reactive diluent, preferably shortly before the curable resin undergoes polymerization: in fact the free radical-generating catalyst system may have a negative impact on the storage stability of the urethane acrylate.

Other ingredients may be also included in the curable resin composition prepared by the process of the present invention, some of these preferably shortly before the curable resin undergoes polymerization, to avoid possible negative impact on the storage stability of the curable resin. Thus, internal mold release agents may be included to facilitate the release of the polymerized composite article from the mold in which it has been prepared: the amount may range from about 0.1% to about 5% by weight of the curable resin composition, and examples of suitable products are the internal mold release agents for composite applications available from Axel or from Wurtz.

Other types of ingredients that may be included in the curable resin are fillers, which may be used for a number of different reasons, such as to provide pigmentation, flame retardance, insulation, thixotropicity, aid with dimensional stability and physical properties, and reduced cost of the composite structure. Suitable fillers for the urethane acrylate layer include reactive and non-reactive conventional organic and inorganic fillers. Examples include, but are not limited to, inorganic fillers, such as calcium carbonate, silicate minerals, for example, both hollow and solid glass beads, phyllosilicates such as antigorite, serpentine, hornblends, amphiboles, chrysotile, and talc; metal oxides and hydroxides, such as aluminum oxides, aluminium hydroxide, titanium oxides and iron oxides; metal salts, such as chalk, barite and inorganic pigments, such as cadmium sulfide, zinc sulfide and glass, inter alia; kaolin (china clay), and aluminum silicate and co-precipitates of barium sulfate and aluminum silicate. Examples of suitable organic fillers include, but are not limited to, carbon black and melamine Thixotropic agents that are useful in this invention include fumed silica, organoclays, inorganic clays and precipitated silica. The amount of filler used for the purposes of this invention, will depend of the type of filler and reason for its presence in the system: thus, the thixotropic agents are often used at levels of up to about 2 percent by weight, while fillers that have a flame retardant action such as aluminium hydroxide, may be used in much larger amounts, in an amount that is in fact comparable or even larger than the amount of curable resin, comprising the urethane acrylate plus the reactive diluent.

Other additives having specific functions, as known in the industry, may also be included in the curable resin composition: examples include but are not limited to, air release agents, adhesion promoters, leveling agents, wetting agents, UV absorbers and light stabilizers.

The polymerization and curing of the curable resin composition is effected, using well-known procedures in the art, preferably in the presence of a polymerization catalyst. The resin composition may be thermally cured or light cured. For thermal curing, the curing temperature is dependent on the particular catalyst utilized. In one embodiment, the curable resin composition can be cured from 25° C. to 200° C., and in another embodiment, the curable resin composition can be cured from 70° C. to 150° C. For light curing, the light source is dependent on the particular photoinitiator catalyst used. The light source can be visible light or UV light. The curable resin composition contains urethane groups which provide toughness to the resin and improved adhesion to substrates and or fibers without dealing with isocyanate groups that are present in urethane resins. They provide the performance of high-end composite resins such as epoxy and polyurethanes with a reactivity that is commonly found in polyester and vinyl ester resins. These compositions can be used in pultrusion, infusion, filament winding, closed mold infusion, and cured-in-place pipe applications. They can be used with glass fibers as well as carbon fibers. A cured article prepared from the curable resin composition can be used to produce composites, coatings, adhesives, inks, encapsulations, or castings. The curable resin composition can be used to produce composites, such as, for example, wind turbines, boat hulls, truck bed covers, automobile trim and exterior panels, pipe, tanks, window liners, seawalls, composite ladders and the like.

EXAMPLES

The present invention will now be explained in further detail by showing Inventive Examples, and Comparative Examples, but the scope of the present invention is not, of course, limited to these Examples.

The materials used are shown in Tables 1, 2, and 3 below.

TABLE 1

Isocyanates and Polyols

| Isocyanates | Suppliers | Weight % NCO | Functionality | IEW | Viscosity at 100° F. |
|---|---|---|---|---|---|
| VORANATE T-80 | Dow Chemical | 48.20 | 2.00 | 87.10 | 2.20 |

| Polyols | | OH Number | Functionality | HEW | Viscosity at 100° F. |
|---|---|---|---|---|---|
| Voranol 8000LM | Dow Chemical | 14.00 | 2.00 | 4000.00 | 1900.00 |
| Voranol 4000LM | Dow Chemical | 28.00 | 2.00 | 2000.00 | 480.00 |
| Polyglycol P425 | Dow Chemical | 264.00 | 2.00 | 212.50 | 35.00 |
| TPG | Dow Chemical | 875.00 | 2.00 | 64.10 | 57.2 at 77° F. |
| Voranol 220-660 | Dow Chemical | 660.00 | 3.00 | 85.00 | 300.00 |

TABLE 2

Reactive Diluents/Capping Agents

| Product | Suppliers | Flash Point ° C. | OH-Functionality |
|---|---|---|---|
| Vinyl Toluene | Deltech Corporation | 53 | 0 |
| HEMA (ROCRYL ™ 400) | Dow Chemical | 106 | 1 |

TABLE 3

Inhibitors/Catalysts/Promoters

| Product | Suppliers |
|---|---|
| 2,2,6,6-Tetramethylpiperidin-1-oxyl (TEMPO) | Sigma-Aldrich |
| DABCO T12 (dibutyltin dilaurate) | Air Products |

Comparative Example 1

In first step of the synthesis, 25.210 g of VORANATE T-80, 9.190 g of TPG and 9.190 g of P425 of Voranol were added to a jar and mixed in a Flacktech mixer. The jar was kept in an oven at 70° C. The NCO content was measured at regular intervals. After 2 hours the NCO content dropped to 13.680%. The reaction mixture was then allowed to cool. A small sample was taken to measure the viscosity of the prepolymer formed in this step (Step 1). Viscosity of the mixture was 44.3 Pa-S at 50° C.

In the 2$^{nd}$ step of the synthesis, HEMA was added to the prepolymer from step 1 in with an HEMA to prepolymer weight ratio of 73.6 to 43.59. Also 100 ppm of DABCO T12 and 100 ppm of free radical inhibitor 2,2,6,6-Tetramethylpiperidin-1-oxyl (TEMPO) were added to the reaction mixture. The contents were mixed in a Flacktek mixer. The jar was kept in an oven at 50° C. until the NCO content approached zero. Viscosity of the urethane acrylate resin produced in this step was 0.088 Pa-s at 50° C. and 0.440 Pa-s at 25° C.

A small sample of the urethane acrylate resin synthesized in step 2 was mixed with the free radical-generating catalyst and promoter as outlined in the procedure of measuring Tg. The glass transition temperature of the resin was 65.7° C.

Inventive Example 1

In first step of the synthesis, 25.752 g of VORANATE T-80, 9.190 g of TPG, 9.190 g of P425, and 12.0 g of Voranol LM 8000 were added to a jar and mixed in a Flacktek mixer. The jar was kept in an oven at 70° C. for 2 hrs. The reaction mixture was then allowed to cool. A small sample was taken to measure the viscosity of the prepolymer formed in this step (Step 1). Viscosity of the mixture was 15.9 Pa-S at 50° C.

In the 2$^{nd}$ step of the synthesis, HEMA added to the prepolymer from step 1 in with an HEMA to prepolymer weight ratio of 85 to 56.132. Also 100 ppm of DABCO T12 and 100 ppm of free radical inhibitor 2,2,6,6-Tetramethylpiperidin-1-oxyl (TEMPO) were added to the reaction mixture. The contents were mixed in a Flacktek mixer. The jar was kept in an oven at 50° C. until the NCO content approached zero. The reaction was then allowed to cool to room temperature. Viscosity of the urethane acrylate resin produced in this step was 0.145 Pa-s at 50° C. and 0.705 Pa-s at 25° C.

A small sample of the urethane acrylate resin synthesized in step 2 was mixed with the free radical-generating catalyst and promoter as outlined in the procedure of measuring Tg. The glass transition temperature of the resin was 95.9° C.

The viscosity of prepolymer from step 1 (15.9 Pa-s) of this example is much lower than that of (44.3 Pa-s) from step 1 of Comparative Example 1. Furthermore, the glass transition temperature of the cured resin was higher (95.9° C.) compared to comparative example 1 (65.7° C.).

Inventive Example 2

The first step in the example was exactly the same as that in Inventive Example 1. The viscosity of the reaction mixture at the end of step 1 was 15.6 Pa-S at 50° C.

In the 2$^{nd}$ step of the synthesis, HEMA was added to the prepolymer. The ratio of HEMA to the prepolymer from step 1 was 52.5 to 56.132. 100 ppm of DABCO T12 and 100 ppm of free radical inhibitor 2,2,6,6-Tetramethylpiperidin-1-oxyl (TEMPO) were also added to the reaction mixture. The contents were mixed in a Flacktek mixer. The jar was kept in an oven at 50° C. until the NCO concentration approached zero. The reaction was then allowed to cool to room temperature. Viscosity of the urethane acrylate resin produced in this step was 0.564 Pa-s at 50° C. and 6.483 Pa-s at 25° C.

In the third step of the synthesis, vinyl toluene, used as a reactive diluent, was added to the urethane acrylate resin from step 2 in a ratio of 32.50 to 108.63. Viscosity of the urethane acrylate resin produced in this step was 0.26 Pa-s at 25° C.

A small sample of the urethane acrylate resin synthesized in step 2 was mixed with the free radical-generating catalyst and promoter as outlined in the procedure for measuring Tg. The glass transition temperature of the resin was 93.4° C.

Once again, the viscosity of the prepolymer from step 1 (15.6 Pa-s) of this example is much lower than that of (44.3 Pa-s) from step 1 of Comparative Example 1. In the 2$^{nd}$ step, the amount of HEMA added was 32.5 g less than that in step 2 of Inventive Example 1. Viscosity of the reaction mixture at the end of the 2$^{nd}$ step was 6.483 Pa-s at 25° C. In the 3$^{rd}$ step, the reaction product from step 2 was mixed with vinyl toluene in a 108.6 to 32.5 pbw ratio. Viscosity of this blend was 0.26 Pa-s at 25° C. The glass transition temperature of the cured resin was 93.4° C.

Inventive Example 3

In first step of the synthesis, 31.782 g of Voranate T-80, 5.0 g of TPG, 5.0 g of P425, 5.0 g of Voranol 230-260 and 14.2 g of Voranol LM 8000 were added to a jar and mixed in a Flacktek mixer. The jar was kept in an oven at 70° C. for 2 hrs. The reaction mixture was then allowed to cool. A small sample was taken to measure the viscosity of the prepolymer formed in this step. The viscosity of the mixture was 7.0 Pa-S at 50° C. The NCO content of the mixture was 13.08%. The calculated NCO content of the mixture was 15.546%. Once again, the experimental NCO content was lower than the calculated value due to presence of moisture in the polyol content. Polyols used in this example were dried to remove any water content to mimic the industrial processes used for making polyurethane prepolymers.

In the 2$^{nd}$ step of the synthesis, HEMA was added to the prepolymer from step 1 with a HEMA to prepolymer weight ratio of 68 to 60.982. 100 ppm of DABCO T12 and 100 ppm of free radical inhibitor 2,2,6,6-Tetramethylpiperidin-1-oxyl (TEMPO) were also added to the reaction mixture. The contents were mixed in a Flacktek mixer. The jar was kept in an oven at 50° C. until the NCO concentration approached zero. The reaction was then allowed to cool to room temperature. Viscosity of the urethane acrylate resin produced in this step was 0.682 Pa-s at 50° C. and 6.210 Pa-s at 25° C.

In the third step of the synthesis, vinyl toluene, used as a reactive diluent, was added to the urethane acrylate resin from step 2 in a 38.624 to 128.928 weight ratio. The viscosity of the urethane acrylate resin produced in this step was 0.25 Pa-s at 25° C.

A small sample of urethane acrylate resin synthesized in step 2 was mixed with the free radical-generating catalyst and promoter as outlined in the procedure of measuring Tg. The glass transition temperature of the resin was 112.6° C.

This example demonstrates that a combination of polyols can be used in this process. With a blend of 2 and 3 functional polyols, the viscosity of the prepolymer from step 2 (7.0 Pa-s) of this example is much lower than that of (44.3 Pa-s) from step 1 of Comparative Example 1. Furthermore, the glass transition temperature of the cured resin was (112.6° C.) compared to Comparative Example 1 (65.7° C.).

The formulations and results are summarized in Table 4, below.

TABLE 4

|  | EW | Func. | CompEx-1 | InvEx-1 | InvEx-2 | InvEx-3 |
| --- | --- | --- | --- | --- | --- | --- |
| Step - 1 - Prepolymer |  |  |  |  |  |  |
| 8000 LM |  | 2.000 |  | 12.000 | 12.000 | 14.200 |
| TPG | 96.000 | 2.000 | 9.190 | 9.190 | 9.190 | 5.000 |
| P425 | 212.500 | 2.000 | 9.190 | 9.190 | 9.190 | 5.000 |
| Voranol 220-260 | 83.330 | 3.000 |  |  |  | 5.000 |
| TDI | 87.100 | 2.000 | 25.210 | 25.752 | 25.752 | 31.782 |
| Viscosity at 50 C. (Pa · s) |  |  | 44.300 | 15.900 | 15.600 | 7.000 |
| NCO % Calculated |  |  | 14.497% | 11.499% | 11.499% | 15.546% |
| NCO % Measured |  |  | 13.680% |  |  | 13.080% |

TABLE 4-continued

|  | EW | Func. | CompEx-1 | InvEx-1 | InvEx-2 | InvEx-3 |
|---|---|---|---|---|---|---|
| Step - 2 - Capping |  |  |  |  |  |  |
| HEMA | 130.140 |  | 73.600 | 85.000 | 52.500 | 68.000 |
| T-12 |  |  | 100 ppm | 100 ppm | 100 ppm | 100 ppm |
| TEMPO |  |  | 100 ppm | 100 ppm | 100 ppm | 100 ppm |
| Viscosity at 50 C. (Pa · s) |  |  | 0.088 | 0.145 | 0.564 | 0.682 |
| Viscosity at 25 C. (Pa · s) |  |  | 0.440 | 0.705 | 6.483 | 6.210 |
| Step - 3 - Dilution |  |  |  |  |  |  |
| Vinyl Toluene |  |  |  |  | 32.500 | 38.624 |
| Viscosity at 25 C. (Pa · s) |  |  | 0.440 | 0.705 | 0.260 | 0.250 |
| NCO/OH Equivalents |  |  | 2.083 | 2.082 | 2.082 | 2.622 |
| % Reactive Diluent |  |  | 0.461 | 0.461 | 0.461 | 0.461 |
| Catalyst |  |  |  |  |  |  |
| Trigonox 239 |  |  | 0.020 | 0.020 | 0.020 | 0.020 |
| Cobalt octoate, 12% Co |  |  | 0.003 | 0.003 | 0.003 | 0.003 |
| DSC Cured Tg1* |  |  | 65.7 | 95.9 | 93.4 | 112.6 |
| High MW PO/PU |  |  | 0.000 | 0.187 | 0.187 | 0.186 |
| High MW PO/Total |  |  | 0.000 | 0.078 | 0.075 | 0.075 |

Test Methods

Test methods include the following:

Viscosity Analysis

The viscosity measurement was performed on Rheometer AR2000 from TA Instruments. Shear rate was 10/s and testing temperature was 25° and 50 C.

Plaque Preparation of Urethane Acrylate

The molds are made from "U"-shaped, ⅛ inch thick aluminum spacers positioned between two sheets of Duo-foil aluminum and compressed between two thick heavy metal plates. The Duo-foil aluminum sheets were coated with a proprietary release agent. A rubber tubing was used for gasket material following the inside dimensions of the spacer. Once assembled, the mold is clamped together with large C-clamps. The open end of the "U"-shaped spacer faces upward, and the duo-foil extends to the edge of the metal plates. The top edge of the Duo-foil is higher than edge of metal plates and bending for the filling of reaction mixture. The plaque was cured at 100° C. for 1-2 hours.

Measurement of Glass Transition Temperature

Approximately 5-10 mg of a sample was placed in hermetic aluminum pans which were then sealed and placed in DSC-TA Instrument Model 2000. The sample was allowed to equilibrate for a few minutes. The temperature was then increased at 2° C. to 150° C. The sample was then quenched to 0° C. and then a second temperature scan was started at 10° C./min to quantify the glass transition temperature of the fully cured sample.

The invention claimed is:

1. A process for making a curable resin composition comprising the steps of:
   (1) reacting
      a) an isocyanate; and
      b) a polyol mixture with a bimodal distribution of
         i) a first polyol mixture comprising polyols having an average equivalent weight of from 50 to 400; and
         ii) a second polyol mixture comprising polyols having an average equivalent weight of from 4000 to 5000 to form a urethane prepolymer; and
   (2) adding a capping agent to the urethane prepolymer to form the curable resin composition.

2. The process of claim 1, further comprising adding a reactive diluent to the curable resin composition.

3. The process of claim 1, further comprising adding a free radical-generating catalyst to the curable resin composition.

4. The process of claim 1, wherein step (1) occurs in a solvent-containing environment.

5. The process of claim 1, wherein step (1) occurs in a solvent-free environment.

6. The process of claim 1, wherein isocyanate-reactive functional groups and isocyanate functional groups are present in step (1) in a weight ratio in the range of from 0.25:1 to 0.9.

7. The process of claim 1 wherein the capping agent is present in step (2) in an excess of at least 20% by weight relative to the urethane prepolymer.

8. The process of claim 1 wherein the first polyol mixture is present in step (1) in an amount in the range of from 20 to 80 percent by weight, and the second polyol mixture is present in step (1) in an amount in the range of from 20 to 80 percent by weight in the polyol mixture.

9. The process of claim 1 wherein the capping agent is selected from the group consisting of hydroxyethyl acrylate, hydroxypropyl acrylate, hydroxyethyl methacrylate, hydroxyethyl acrylamide, hydroxypropyl acrylamide, and mixtures thereof.

10. The process of claim 2, wherein the reactive diluent is selected from the group consisting of vinyl toluene, divinyl benzene, methyl methacrylate, tert-butyl methacrylate, isobutyl methacrylate, hydroxyethyl acrylate, hydroxypropyl acrylate, hydroxyethyl methacrylate, hydroxyethyl acrylamide, hydroxypropyl acrylamide, 1,4-butanediol diacrylate (BDDA), 1,6-hexanediol diacrylate (HDDA), diethylene glycol diacrylate, 1,3-butylene glycol diacrylate, neopentyl glycol diacrylate, cyclohexane dimethanol diacrylate, dipropylene glycol diacrylate, tripropylene glycol diacrylate, ethoxylated bisphenol A diacrylate, trimethylolpropane triacrylate, pentaerythritol triacrylate, pentaerythritol tetraacrylate, and mixtures thereof.

11. The process of claim 3, wherein the free radical-generating catalyst is selected from the group consisting of tert-Butyl peroxyneodecanoate, benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, azobis-isobutyronitrile, 2-tbutylazo-2-cyano-4-methylpentane, and 4-t-butylazo-4-cyano-valeric acid, and mixtures thereof.

12. The process of claim 1 wherein an inhibitor selected from the group consisting of (2,2,6,6-Tetramethylpiperidin-1-yl)oxyl (TEMPO), Mono Methyl Ether of Hydroquinone (MEHQ), dihydroxybenzenes, benzoquinones, hindered phenols, and combinations thereof is added concurrently with the capping agent.

13. The curable resin composition prepared by the process of claim 1.

14. The curable resin composition of claim 13 having a glass transition temperature above 75° C.

15. A filament winding process incorporating the curable resin composition of claim 13.

16. A pultrusion process incorporating the curable resin composition of claim 13.

17. A cured-in-place pipe process incorporating the curable resin composition of claim 13.

18. An infusion process incorporating the curable resin composition of claim 13.

19. A cured article comprising a composite, a coating, an adhesive, an ink, an encapsulation, or a casting prepared from the curable resin composition of claim 13.

* * * * *